(12) United States Patent
Kehrein et al.

(10) Patent No.: US 12,041,132 B2
(45) Date of Patent: Jul. 16, 2024

(54) METHOD FOR PROVIDING OBJECT-LINKED COMMUNICATION IN RELATION TO PHYSICAL OBJECTS

(71) Applicant: Connect One Digital AG, Frankfurt (DE)

(72) Inventors: Carsten Kehrein, Koblenz (DE); Thomas Nieraad, Hofheim (DE)

(73) Assignee: Connect One Digital AG, Frankfurt (DE)

( * ) Notice: Subject to any disclaimer, the term of this patent is extended or adjusted under 35 U.S.C. 154(b) by 0 days.

(21) Appl. No.: 17/945,342

(22) Filed: Sep. 15, 2022

(65) Prior Publication Data

US 2023/0123321 A1   Apr. 20, 2023

(51) Int. Cl.
*H04L 67/12* (2022.01)
*G16Y 10/45* (2020.01)
*G16Y 10/75* (2020.01)

(52) U.S. Cl.
CPC .............. *H04L 67/12* (2013.01); *G16Y 10/45* (2020.01); *G16Y 10/75* (2020.01)

(58) Field of Classification Search
CPC .......... H04L 67/12; G16Y 10/75; G16Y 10/45
See application file for complete search history.

(56) References Cited

U.S. PATENT DOCUMENTS

2018/0300124 A1* 10/2018 Malladi ................ H04L 67/561
2019/0158353 A1*  5/2019 Johnson .............. H04L 41/0803

\* cited by examiner

*Primary Examiner* — Normin Abedin
(74) *Attorney, Agent, or Firm* — MARSHALL, GERSTEIN & BORUN LLP (57) ABSTRACT

The invention relates to a method for providing object-related communication that takes place based on a physical object (101, 102, 103), including the steps: creating a digital representation (101', 102', 103') of a physical object (101, 102, 103), preferably on an IoT platform (6), the physical object (101, 102, 103) including at least one information carrier (I), the information carrier (I) including at least one identifier (UID), the physical object (101, 102, 103) being unequivocally assignable to its digital representation (101', 102', 103'), based on the identifier (UID), and the information carrier (I) being readable by means of communication devices (10, 20, 30) in order to at least partially access the particular digital representation (101', 102', 103'), providing a configurable information container (101a, 102a, 103a) for the digital representation (101', 102', 103'), it being possible for the information container (101a, 102a, 103a) to include at least one static information packet and/or at least one dynamic information packet and/or at least one access-sensitive information packet and/or a gateway information packet, each static information packet being processable solely by communication devices (10, 20, 30) of information issuers (4), each dynamic information packet being processable by communication devices (10, 20, 30) that are not solely information issuers (4), each access-sensitive information packet being automatically supplemented based on an access by a communication device (10, 20, 30), and the gateway information packet allowing communication between communication devices (10, 20, 30).

14 Claims, 5 Drawing Sheets

METHOD FOR PROVIDING OBJECT-LINKED COMMUNICATION IN RELATION TO PHYSICAL OBJECTS

TECHNICAL FIELD

The present invention relates in general to the technical field of information technology, and in particular to a method for providing object-related communication that takes place based on a physical object. Moreover, the present invention relates to an IoT platform, a digital representation of a physical object, and a communication device for carrying out the method. Furthermore, the present invention relates to a computer program for carrying out the method.

BACKGROUND OF THE INVENTION

The internet of Things (IoT) is a collective term for technologies that allow physical objects and digital objects to be linked to one another, and to cooperate using information and communication technologies. One approach implemented in the prior art is to create digital representations of physical objects. In particular in the field of lean manufacturing, options that provide an internet of Things are used to optimize material flows, for example. A further field in which the internet of Things has gained increasing importance in the past is the area of "smart homes." Devices, for example customary household appliances, are provided with a digital depiction on a server, via which they may be monitored or controlled, for example.

The concept of the internet of Things in the area of communication has comparatively less significance. Thus, there is a need for utilizing the internet of Things also for the area of communication.

Therefore, the object of the present invention is to provide a method that allows object-related communication of information in a simple manner. The intent is to preferably reduce the need for data which could reveal the identity of persons.

Moreover, the object of the present invention is to provide an IoT platform, a digital representation of a physical object, and a communication device that allow the method to be carried out.

Furthermore, the object of the present invention is to provide a computer program including commands that allow the method to be carried out.

SUMMARY

The above objects are achieved in particular by the subject matter of claims 1, 14, and 15. Further features and details of the present invention result from subclaims 2 through 13, the description, and the drawings.

The method according to the invention for providing object-related communication that takes place based on a physical object includes the steps:
  creating a digital representation of a physical object, preferably on an IoT platform, the physical object including at least one information carrier,
  the information carrier including at least one identifier, the physical object being unequivocally associatable with its digital representation, based on the identifier, and
  the information carrier being readable by means of communication devices in order to at least partially access the particular digital representation,
  providing a configurable information container for the digital representation, it being possible for the information container to contain at least one static information packet and/or at least one dynamic information packet and/or at least one access-sensitive information packet and/or a gateway information packet,
  each static information packet being processable solely by communication devices of information issuers,
  each dynamic information packet being processable by communication devices that are not solely information issuers,
  each access-sensitive information packet being automatically supplemented based on an access by a communication device, and
  the gateway information packet allowing communication between communication devices.

The information container particularly preferably contains at least two different information packets from the following types of information packets: static information packet, dynamic information packet, access-sensitive information packet, gateway information packet. It may also be provided that the information container contains at least three different information packets from the following types of information packets: static information packet, dynamic information packet, access-sensitive information packet, gateway information packet.

Within the meaning of the present invention, physical objects may in particular be everyday items or also publicly accessible items. For example, a physical object within the meaning of the present invention may be a coffee cup, a beer glass, a T-shirt, or a book. However, a public drinking fountain or a sightseeing attraction may also be a physical object within the meaning of the present invention. Digital representations are created for these physical objects on the IoT platform. The IoT platform may in particular be designed as a server.

When a digital representation of a physical object is created, in simple terms this means that a data packet that is unequivocally assigned to the physical object and/or associated with same is created on the IoT platform. The physical object includes an information carrier, wherein an identifier, in particular a unique identifier (UID), is readably stored on the information carrier. The unique identifier may be read by a reading device of a communication device, for example; the communication device may be designed in particular as a mobile terminal. The unique identifier (UID) thus ensures unequivocal assignability between a physical object and its digital representation.

In particular, the reading device may include a camera and/or a near-field communications interface and/or a short-range communications interface. The reading device is particularly preferably designed as an NFC, RFID, or Bluetooth interface.

The unique identifier may be converted into a persistent identifier (PID) by the communication device, for example. The persistent identifier may particularly advantageously include the unique identifier to allow an unequivocal assignment to a digital representation. The persistent identifier may in particular be designed as an internet link, so that the communication device, which may be designed as a mobile terminal, may access the digital representation via the internet. Alternatively or additionally, the information carrier may be read by means of a communication device in order to access the digital representation in the same way.

To ensure object-related communication, also between various communication devices, when the digital representation is accessed it is addressed, in particular by means of the above-described persistent identifier (PID), which contains the unique identifier (UID). Various communication devices that are to carry out communication with one another thus in particular do not address one another directly, but, rather, in each case address only the digital representation.

An information container of a digital representation is to be understood as a data repository in which information packets are present and/or to which information packets are addable and/or from which information packets are removable. In this sense, a fully configured information container may also be regarded as a cluster of information packets.

According to the invention, various types of information packets are available:
  static information packets,
  dynamic information packets,
  access-sensitive information packets, and
  gateway information packets.

The various information packets have functions that are different from one another, so that the method according to the invention is usable in a particularly versatile and flexible manner by providing the various types of information packets. The method may thus advantageously take different requirements and different physical objects into account.

To differentiate the various types of information packets from one another, the following configuration is presupposed: A physical object with an information carrier and a corresponding digital representation of this physical object exist on the IoT platform. In addition, there are information issuers IE1 and IE2 and users N1, N2, and N3, each of which has a communication device.

An information issuer is the entity that configures the information container of a digital representation of a physical object, i.e., provides—possibly various—information packets in the information container. The information issuer may do this using a communication device that has the necessary authorization for configuring information containers.

A user is the entity that accesses the digital representation using a communication device, but that cannot influence the existence of information packets in the information container.

A static information packet is to be understood as an information packet that is provided in the information container by an information issuer IE1 or IE2. The static information packet contains static information, i.e., information that is not changeable by user N1, N2, or N3. For example, a user N1, using his/her communication device, may access the digital representation by reading the information carrier, and may open, observe, and/or retrieve the static information packet. In the simplest case, this involves information about the physical object, for example operating instructions or historical background information.

A dynamic information packet is to be understood as an information packet that is likewise provided in the information container by an information issuer IE1 or IE2. In contrast to static information packets, however, the dynamic information packet contains information that may also be processed by user N1, N2, or N3. The processing includes in particular changing, completing, and/or deleting existing information. For example, a user N1, using his/her communication device, may access the digital representation by reading the information carrier, and may process the dynamic information packet. A user N2 and/or N3, who likewise with their/his/her communication device access(es) the digital representation by reading the information carrier, may view the processing and optionally carry out their/his/her own processing. As a result of the dynamic information packet being on the IoT platform, processing in real time is advantageously possible. In other words, a user N2 and/or N3 may advantageously immediately view the processing by user N1.

An access-sensitive information packet is to be understood as an information packet with integrated automatism. The automatism ensures that supplementation of the information in the access-sensitive information packet takes place with each access. The term "access-sensitive" thus means that the information packet, upon an access, quasi-independently performs the automatism of supplementing the information. The supplementation of the information may be implemented, for example, by an access counter that may be provided by the IoT platform via software, for example as a web application, so that the number of accesses is tracked. Based on the access information, certain actions, which in particular may be predefined, may be triggered.

A gateway information packet is to be understood as a type of cache for information. Various communication devices, for example of users N1, N2, and N3, may access the gateway information packet and communicate with one another without directly addressing one another. In particular only the digital representation of the physical objects whose information carrier has been read, or more precisely, the gateway information packet, is addressed. The various users N1, N2, and N3 may access the gateway information packet at the same time or at different times, and may information that one of the users N1, N2, or N3 or multiple users has/have stored there. Communication thus takes place between various users, and direct addressing of the users or of the communication devices of the users is dispensed with.

One example of a physical object with a digital representation, whose information container may particularly advantageously contain a gateway information packet, is a public drinking fountain. This drinking fountain may be equipped with an information carrier within the scope of a geocaching game, for example, so that participants in the geocaching game may communicate with one another. Since participants of a geocaching game generally do not know one another beforehand, i.e., are strangers, it is generally undesirable to immediately reveal their identities to one another. At the same time, a social exchange, i.e., communication, is desired. However, the participants of a geocaching game are often not at the same place at the same time, so that personal verbal communication is not possible. Anonymous communication among the participants is advantageously made possible by the object-related communication. If the geocaching game takes place in a forest, for example, selected trees may be provided with information carriers.

In any case, the provision with an information carrier may in particular be temporary so that the information carrier may also be removed and/or deactivated if necessary.

The communication via the information packets has the advantage that data that could reveal the identity of persons, in particular users, are not necessary. Decentralized and anonymous communication concerning objects may thus be achieved.

It is preferably provided that the method further includes:
  providing a communication channel between a communication device and the IoT platform when the communication device directly or indirectly reads the information carrier of the physical object, the communication device preferably having an internet connection via which it accesses the particular digital representation.

To allow a communication between a communication device and the IoT platform, a communication channel is provided when the communication device reads the identifier by reading the information carrier. The reading of the information carrier may take place directly, i.e., by actual reading of the information carrier on the physical object, or indirectly, i.e., by reading a depiction or duplicate of the information carrier, which is situated, for example, on another mobile terminal that has previously read the physical object. It is thus advantageously made possible that a communication channel between a communication device and the IoT platform may be established even without the presence of the physical object. An internet connection of the communication device is particularly advantageously used for the communication with the IoT platform, a mobile data network particularly preferably being utilized for the internet connection.

In addition, it may be provided that when the communication channel is provided, the IoT platform sends information packets via the communication channel and receives requests and/or information via the communication channel.

If a communication channel is provided, information packets may be communicated between a communication device and the IoT platform. Requests and/or information may be exchanged via the communication channel. Requests may be access requests, for example, which enable the IoT platform of the communication device to display information that is stored in an information container of the digital representation of the physical object. In addition, information may be sent via the communication channel from the communication device to the IoT platform, which in turn receives this information. Particularly efficient communication between a communication device and the IoT platform is thus made possible.

It is particularly preferably provided that multiple communication channels for various communication devices are provided when the various communication devices directly or indirectly read the information carrier of the physical object.

When various communication devices directly or indirectly read an information carrier of a physical object, the IoT platform may provide multiple communication channels for each communication device. An information packet in the information container of the digital representation of the physical object may thus be accessed at the same time. The access particularly advantageously takes place in real time. In addition, object-related communication between the various communication devices may be made possible due to the multiple communication channels between the IoT platform and the various communication devices. It is not necessary for communication devices to directly address one another. The entire communication takes place via the IoT platform; i.e., the IoT platform is addressed, while the communication devices, and thus the users of the communication devices, remain anonymous.

It is preferably provided that when the information container includes a gateway information packet, the gateway information packet acts as a cache for information that is communicated from communication devices to the digital representation to allow communication between various communication devices by relaying this information to other communication devices, this preferably taking place via a combination of multiple communication channels.

Particularly efficient communication between communication devices is made possible as the result of a gateway information packet that acts as a cache for information. Various communication channels between the IoT platform and the various communicating communication devices are utilized. The communication may take place in real time or in a time-offset manner.

The gateway information packet acts as a cache, in that information communicated by a communication device is kept ready in order to provide it to a communication device that accesses the gateway information packet at the same time or at a later time. Multiple communication devices may also particularly preferably provide information in real time and thus communicate with one another. Anonymity of the users of the communication devices may be ensured in a particularly advantageous manner due to the communication of various communication devices via the gateway information packet.

It may advantageously be provided that when the information container includes at least one access-sensitive information packet, with each access by a communication device the access-sensitive information packet is supplemented with additional information about the access that takes place, the supplementation preferably including the time of the access and/or the type of communication device that has accessed the information packet.

Due to providing an access-sensitive information packet, it is made possible in a particularly simple manner to track, for example, the number of accesses to the information packet. In addition, the time of the access and/or the type of communication device that has accessed the information packet may be tracked. As the result of tracking the time of the access, for example the network load may be optimized in a time-dependent manner. Thus, for example, by means of machine learning it may be ascertained at what times or times of day a particularly large number of accesses takes place, in order to optimize the IoT platform in the future for these times and times of day in order to achieve a particularly high network load.

Information about the type of communication device that has accessed the information packet may be used, for example, to detect possible malfunctions of the IoT platform, for example when establishing communication channels with certain communication devices, and to remedy these errors. For example, communication devices from certain manufacturers that use a certain operating system, for example, may require an optimization of the IoT platform to ensure smooth communication.

The information about the number of accesses may be used in particular to trigger certain actions. For example, an information issuer who has provided an access-sensitive information packet in the information container of the digital representation of the physical object may be notified or prompted, after a predefined number of accesses, to perform a certain action. It may also be provided, for example, that after a certain number of accesses, no further accesses to the digital representation or to the access-sensitive information packet or to certain information packets in the information container of the digital representation are permitted. The method according to the invention is thus usable in a particularly versatile and flexible manner.

The method according to the invention may further include:
  communicating an overview of all information packets, present in the information container, to a communication device when the communication device directly or indirectly reads the information carrier of the physical object and accesses the digital representation, the overview of the information packets preferably being displayed by a display device of the communication device, and certain information packets that are to be retrieved from the IoT platform by the communication device being selectable via an input into the communication device.

An information container of a digital representation of a physical object optionally includes multiple information packets. If the digital representation or the information container is accessed by a communication device by reading the information carrier of the associated physical object, it is generally desirable to obtain an overview of all available information packets. The IoT platform provides such an overview of the available information packets that are present in the information container. A display device of the communication device may display this overview in a particularly advantageous and simple manner. An input by the user of the communication device may result, for example, in a selection of certain information packets that are to be retrieved from the IoT platform by the communication device. The selected information packets may be locally stored on the communication device if necessary.

The method according to the invention preferably includes:
configuring the information container of the digital representation, the configuring of the information container preferably being carried out by a communication device of an information issuer who preferably is neither the owner nor the issuer of the physical object, including
i) adding at least one information packet to the information container of the digital representation, and/or
ii) removing at least one information packet from the information container of the digital representation.

A configurably designed information container is particularly advantageous with regard to variability and flexibility. Information packets may thus be added or removed as needed, or depending on external circumstances. The configuration may in particular take place regardless of whether the physical objects are placed on the market.

As described above, the configuring of the information container may take place either by adding information packets or by removing information packets. For adding information packets, desired information packets may advantageously be added. For removing information packets, a plurality of information packets may be stored in advance, during the configuration of the information container it being possible to remove unwanted information packets in a targeted manner. A particularly simple option is thus provided for storing certain information packets in an information container of a digital representation that is associated with a physical object.

The method may also include:
providing an information packet pool that includes available information packets, it being possible for information packets of the information packet pool that are newly available to be created by an information issuer, who preferably is neither the owner nor the issuer of the physical object.

The configuring of the information container may take place in a particularly simple manner by providing an information packet pool with available information packets. The information packet pool may be kept in particular by an IoT platform. Various predefined information packets, which may be used as a template for configuring the information containers, may be stored in the information packet pool. The creation of newly available information packets in the information packet pool may be carried out in particular by an information issuer. The information issuer is preferably a third party who is neither the owner nor the issuer of the physical object.

It is thus advantageously possible to provide and/or revise an information packet pool, which leaves room for the creativity of third parties and allows creation of a broad spectrum of available information packets. By keeping issuers of the physical objects, the owners of physical objects, information recipients or users, and information issuers separate, it is advantageously possible for various actors to collaborate with one another.

It may also be provided that the configuring of the information container of the digital representations takes place at least semiautomatically, in that the information packets that are available for the digital representation are preferably automatically preselected, based on a certain feature of the digital representation, via machine learning.

The configuring is advantageously simplified by providing configuring of the information container that takes place at least semiautomatically. In this way, certain information packets that are based on the physical object may be preselected, for example as a function of the physical object or as a function of the digital representation or as a function of a stored feature in the digital representation. The at least semiautomatic configuring may in particular include outputting a list of information packets that is sorted according to relevance, with the list of information packets sorted in order of decreasing relevance. Information packets whose information and/or functions, depending on the type of information packet, have a particularly good match with the physical object in question have high relevance.

The assessment of the relevance, or whether an information packet matches a particular physical object, may be advantageously assisted by machine learning. Inputs by an information issuer who adds certain information packets to an information container of a digital representation may be used and evaluated as training data in order to derive criteria for assessing the relevance and for the at least semiautomatic configuring (supervised machine learning).

It is preferably provided that for creating the digital representation, an initially unassigned digital representation is created regardless of the existence of the physical object, it being possible to subsequently link to the physical object by means of the identifier.

As a result of the existence of the digital representation and the existence of the physical object being independent, the flexibility and variability of the method according to the invention are advantageously increased. Thus, for example, a physical object may exist or be manufactured long before a digital representation is created. It is thus possible to also subsequently create digital representations of physical objects that have already been manufactured or that have been in use for years. Conversely, digital representations that are only subsequently linked to the physical objects may be created in advance, based on a planned production of physical objects. In particular, it is thus advantageously made possible for the manufacturer and/or issuer of the physical objects and the creator of the digital representations to be different actors.

The method may further include:
issuing the physical object with the information carrier, wherein the manufacture of the physical object, the manufacture of the information carrier, and the addition of the information carrier to the physical object take place independently of one another, and are preferably carried out by at least two different actors.

A further increase in the flexibility and variability of the method is thus achieved, in that the manufacturer and/or issuer of the physical object and the manufacturer of the information carrier may be actors that are different from one another. In addition, the actor who adds the information carrier to the physical object may be a different actor. For example, a contract manufacturer A may manufacture a physical object, and a contract manufacturer B may manufacture an information carrier, while a third company C, which may, for example, be the contracting entity for contract manufacturers A and B, adds the information carrier to the physical object.

Adding the information carrier to the physical object may take place in particular using conventional fastening mechanisms, depending on the nature and the material of the physical object, and/or the information carrier. For example, it would be conceivable to adhere the information carrier to the physical object. Printing, laminating, or sewing the information carrier is also possible. Alternatively or additionally, the information carrier may be issued separately as an add-on to a physical object.

The method also preferably includes:

enabling the digital representation for configuring the information container, the enabling being a mandatory prerequisite for configuring the information container of the digital representation, and the enabling preferably including:

a) granting permission for the configuring, preferably to certain actors, and/or b) establishing rules for the configuring, wherein the rules may include one or more of the following rule types:

b1) the particular information container may contain only static information packets;

b2) the particular information container may contain only dynamic information packets;

b3) the particular information container may contain only access-sensitive information packets;

b4) the particular information container may contain only gateway information packets;

b5) the particular information container must contain at least one static information packet and at least one dynamic information packet;

b6) the particular information container must contain at least one static information packet and at least one access-sensitive information packet;

b7) the particular information container must contain at least one static information packet and a gateway information packet;

b8) the particular information container must contain at least one dynamic information packet and at least one access-sensitive information packet;

b9) the particular information container must contain at least one dynamic information packet and a gateway information packet;

b10) the particular information container must contain at least one access-sensitive information packet and a gateway information packet;

b11) the particular information container must contain at least one static information packet and at least one dynamic information packet and at least one access-sensitive information packet;

b12) the particular information container must contain at least one static information packet and at least one dynamic information packet and a gateway information packet;

b13) the particular information container must contain at least one static information packet and at least one access-sensitive information packet and a gateway information packet;

b14) the particular information container must contain at least one dynamic information packet and at least one access-sensitive information packet and a gateway information packet;

b15) the particular information container may contain only certain information packets from an information packet pool;

b16) there is a maximum limit for the number of information packets in the particular information container;

b17) there is a minimum limit for the number of information packets in the particular information container;

b18) the addition or the removal of information packets may take place only within certain time periods and/or at certain times of day;

b19) the addition or the removal of information packets can take place only when a certain further condition besides the enabling of the digital representation is met.

By providing an absolutely necessary enabling step of the digital representation for configuring the information container, it may be ensured that the information container contains no unwanted information packets, or whether information packets are added at all, even though this is still unwanted or not yet permitted. For example, an issuer of physical objects may be provided as the entity that decides when and/or whether the information container of the digital representation, which is assigned to the particular physical object, is allowed to be provided with information packets or with certain information packets. Security is thus advantageously increased, and unwanted functionalities are avoided. In this way, certain actors may be enabled to administer an information container.

Particular rules may also contribute to further enhancement of the security and desired functionality. Thus, for example, for purposes of protecting children, it is possible for only certain information packets and/or a certain type of information packet to be addable to or removable from the information container. In turn, as described above, a certain actor, for example the issuer of the physical objects, may decide on the rules. It may particularly advantageously be provided that rules for the configuration are freely definable or addable, in particular addable to the digital representations. One example of such a rule is providing for the establishment of a maximum limit for the number of addable information packets. The situation may thus advantageously be avoided that the number of available information packets in an information container becomes unclear due to their quantity. In addition, for example a rule may be provided, according to which the addition or removal of information packets may take place only if one or more certain further conditions besides the enabling of the digital representation are met. Such a further condition may be, for example, a recorded access by a communication device.

According to the invention, an IoT platform, or a digital representation of a physical object, or a communication device is provided, provided and configured to carry out the particular steps of the method according to the invention.

According to the invention, in addition a computer program is provided that includes commands which, when the program is executed by a computer, prompt the computer to carry out the method according to the invention.

The technical advantages and embodiments described with regard to the method according to the invention equally apply to the IoT platform according to the invention, to the digital representation, to the communication device, and to the computer program according to the invention.

BRIEF DESCRIPTION OF THE DRAWINGS

Preferred embodiments of the present disclosure are described below with reference to the following figures.

DESCRIPTION OF PREFERRED EXEMPLARY EMBODIMENTS

According to the embodiments of the present invention illustrated in FIGS. 1, 2, 3, and 4, an IoT platform 6 that includes an information packet pool 7 and digital representations 101', 102', 103' is provided. The digital representations 101', 102', 103' are each unique representations of respective physical objects 101, 102, 103. The physical objects 101, 102, 103 include an information carrier I with a unique identifier UID stored thereon, via which a particular physical object 101, 102, 103 is unequivocally assignable to its digital representation 101', 102', 103'. Conversely, the particular digital representation 101', 102', 103' of a physical object 101, 102, 103 may be unequivocally assigned to the respective physical object 101, 102, 103 by means of a corresponding identifier UID that is also stored in the digital representation 101', 102', 103'. For example, the digital representation 101' is the representation of the physical object 101, the digital representation 102' is the representation of the physical object 102, and the digital representation 103' is the representation of the physical object 103.

Figure 6:
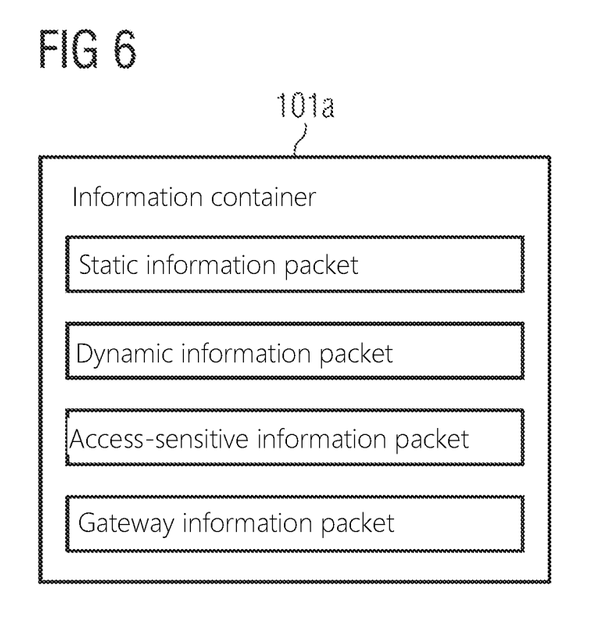
FIG. 6: shows a schematic illustration of an information container of embodiments of the present invention.

The IoT platform 6 provides an information packet pool 7. The information packet pool 7 includes preconfigured information packets. As illustrated in FIG. 6, these information packets may be static information packets, dynamic information packets, access-sensitive information packets, or gateway information packets.

The various information packets have functions that are different from one another, so that the method according to the invention is usable in a particularly versatile and flexible manner by providing the various types of information packets. The method may thus advantageously take different requirements and different physical objects 101, 102, 103 into account.

To differentiate the various types of information packets from one another, the following configuration is presupposed: A physical object 101 with an information carrier I and a corresponding digital representation 101' of this physical object 101 exist on the IoT platform 6. In addition, there are information issuers IE1 and IE2 and users N1, N2, and N3, each of which has a communication device 10, 20, 30.

An information issuer 4 is the entity that configures the information container 101*a* of a digital representation 101 of a physical object 101, i.e., provides—possibly various—information packets in the information container 101*a*. The information issuer 4 may do this using a communication device 10, 20, 30 that has the necessary authorization for configuring information containers 101*a*.

A user is the entity that accesses the digital representation 101 using a communication device 10, 20, 30, but that cannot influence the existence of information packets in the information container 101*a*.

A static information packet is to be understood as an information packet that is provided in the information container 101*a* by an information issuer IE1 or IE2. The static information packet contains static information, i.e., information that is not changeable by user N1, N2, or N3. For example, a user N1, using his/her communication device 10, may access the digital representation 101' by reading the information carrier I, and may open, observe, and/or retrieve the static information packet. In the simplest case, this involves information about the physical object 101, for example operating instructions or historical background information.

A dynamic information packet is to be understood as an information packet that is likewise provided in the information container 101*a* by an information issuer IE1 or IE2. In contrast to static information packets, however, the dynamic information packet contains information that may also be processed by user N1, N2, or N3. The processing includes in particular changing, completing, and/or deleting existing information. For example, a user N1, using his/her communication device 10, may access the digital representation 101' by reading the information carrier I, and may process the dynamic information packet. A user N2 and/or N3, who likewise with their/his/her communication device 20, 30, respectively, access(es) the digital representation by reading the information carrier I, may view the processing and optionally carry out their/his/her own processing. As a result of the dynamic information packet being on the IoT platform, processing in real time is advantageously possible. In other words, a user N2 and/or N3 may advantageously immediately view the processing by user N1.

An access-sensitive information packet is to be understood as an information packet with integrated automatism. The automatism ensures that supplementation of the information in the access-sensitive information packet takes place with each access. The term "access-sensitive" thus means that the information packet, upon an access, quasi-independently performs the automatism of supplementing the information. The supplementation of the information may be implemented, for example, by an access counter that may be provided by the IoT platform 6 via software, for example as a web application, so that the number of accesses is tracked. Based on the access information, certain actions, which in particular may be predefined, may be triggered.

A gateway information packet is to be understood as a type of cache for information. Various communication devices 10, 20, 30, for example of users N1, N2, and N3, respectively, may access the gateway information packet and communicate with one another without directly addressing one another. In particular, only the digital representation 101', 102', 103 of the physical object 101, 102, 103 whose information carrier has been read, or more precisely, the gateway information packet, is addressed. The various users N1, N2, and N3 may access the gateway information packet at the same time or at different times, and may information that one of the users N1, N2, or N3 or multiple users has/have stored there. Communication thus takes place between various users, and direct addressing of the users or of the communication devices 10, 20, 30 of the users is dispensed with.

One example of a physical object 101, 102, 103 with a digital representation 101', 102', 103', whose information container 101*a*, 102*a*, 103*a* may particularly advantageously contain a gateway information packet, is a public drinking fountain. This drinking fountain may be equipped with an information carrier I within the scope of a geocaching game, for example, so that participants in the geocaching game may communicate with one another. Since participants of a geocaching game generally do not know one another beforehand, i.e., are strangers, it is generally undesirable to immediately reveal their identities to one another. At the same time, a social exchange, i.e., communication, is desired. However, the participants of a geocaching game are often not at the same place at the same time, so that personal verbal communication is not possible. Anonymous communication among the participants is advantageously made possible by the object-related communication. If the geocaching game takes place in a forest, for example, selected trees may be provided with information carriers I.

In any case, the provision with an information carrier I may in particular be temporary, for example for playing a game, so that the information carrier I may also be removed and/or if necessary.

The communication via the information packets has the advantage that data that could reveal the identity of persons, in particular users, are not necessary. Decentralized and anonymous communication about objects may thus be achieved.

Preconfigured information packets may be added to the information packet pool 7 as desired, preconfigured information packets may be removed from the information packet pool 7, and preconfigured information packets of the information packet pool 7 may be processed. The addition or removal of information packets to or from the information packet pool 7 may be carried out in particular by an information issuer 4. For this purpose, the information issuer 4 accesses the IoT platform 6 and independently makes any desired adaptations to the information packet pool 7. For adapting the information packet pool 7 by an information issuer 4, it may be necessary for the information issuer 4 to perform a separate authentication in order to check whether or not an adaptation of the information packet pool 7 by the particular information issuer 4 is permissible.

An information container 101*a*, 102*a*, 103*a* for each digital representation 101, 102, 103 is also provided on the IoT platform. Information packets may be present in the particular information containers 101*a*, 102*a*, 103*a*. The information containers 101*a*, 102*a*, 103*a* of the respective digital representations 101, 102, 103 include selected information packets that are specifically linked for the particular digital representation 101', 102', 103' or for the particular physical object 101, 102, 103 that is associated with the respective digital representation 101', 102', 103'. An information container 101*a*, 102*a*, 103*a* may, for example, be at least semiautomatically filled with information packets from the information packet pool 7, or information packets from the information container 7 may be actively added to an information container 101*a*, 102*a*, 103*a*, by an information issuer 4. In the case of a preconfigured information container 101*a*, 102*a*, 103*a* that already contains information packets, information packets may be removed therefrom, in particular by an information issuer 4. Desired information packets may thus be entered into an information container 101*a*, 102*a*, 103*a* or removed from an information container 101*a*, 102*a*, 103*a* in a simple manner. An information container 101*a*, 102*a*, 103*a* may in particular be adapted by an information issuer 4. The information issuer may preferably also create and add new information packets that previously were not present in the information packet pool 7.

The IoT platform 6 manages the access rights and/or processing rights that an information issuer 4 has with regard to the information packet pool 7 and/or information containers 101*a*, 102*a*, 103*a*. Thus, certain information issuers 4 may be allowed to process the information containers 101*a*, 102*a*, 103*a* of certain digital representations 101', 102', 103', although the information issuer is denied processing of the information packet pool 7. In addition, certain information issuers may be allowed to adapt only the information packet pool 7. The processing by an information issuer 4 includes in particular the creation, addition, removal, or changing of information packets.

Figure 5:
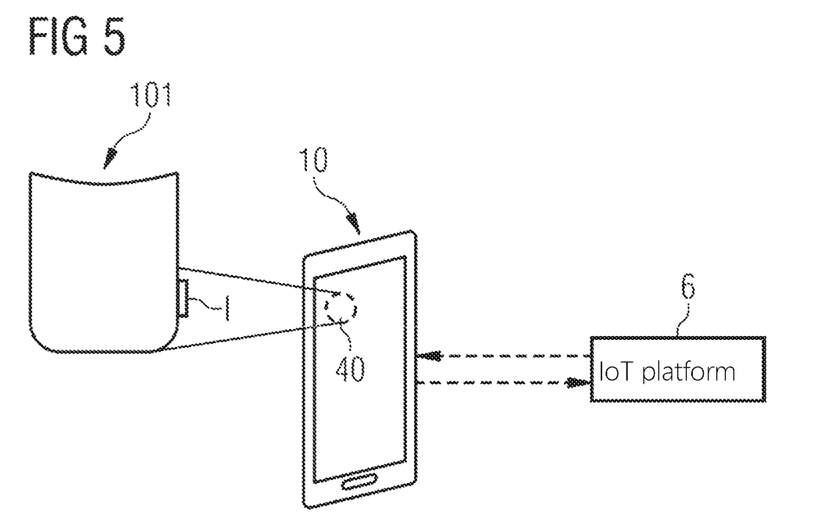
FIG. 5 schematically shows reading in of an authorization by a communication device according to embodiments of the present invention.

The communication devices 10, 20, 30 may read information carriers I of the physical objects 101, 102, 103. As illustrated in FIG. 5, this may take place via a reading device 40, which may be designed as a camera or as an NFC or RFID reader, for example. The communication devices may in particular be mobile terminals of users. Each physical object 101, 102, 103 has an information carrier I with an identifier UID via which the particular physical objects 101, 102, 103 are unequivocally assignable to a corresponding digital representation 101', 102', 103' in the IoT platform 6. To access the digital representation 101', 102', 103' after a communication device 10, 20, 30 has read the particular information carrier I, the particular communication device 10, 20, 30 preferably converts the identifier UID into a persistent identifier PID. The persistent identifier PID may particularly advantageously include or be formed from the identifier UID, which in particular is designed as a unique identifier, to allow an unequivocal assignment to a digital representation 101', 102', 103' via a data network. A mobile radio communications network, for example, may be used as a data network. The persistent identifier PID may in particular be designed as an internet link, so that the particular communication device 10, 20, 30 may access the digital representation 101', 102', 103' or the information container 101*a*, 102*a*, 103*a* of the respective digital representation 101', 102', 103' via the internet in order to check the presence of any information packet for the particular physical object 101, 102, 103 and to access it. Such an access may take place by multiple communication devices 10, 20, 30 at the same time.

The information carrier I of a physical object 101, 102, 103 does not have to be read directly; indirect reading is also possible. Thus, for example, a carrier device, which may be a communication device, may read the information carrier I at a point in time t=0 and locally store the read information, in particular the identifier UID. Further communication devices may selectively read the information carrier on the physical object 101, 102, 103 or the information carrier that is locally stored on the carrier device, which is now a virtual duplicate of the information carrier I, at a point in time t>0, i.e., at a later point in time. In both cases, an access to the IoT platform 6 and to the particular digital representation 101', 102', 103' may take place. Thus, from a functional standpoint, the existence or the presence of the physical object 101, 102, 103 is replaced. As a result, the physical object 101, 102, 103 particularly advantageously does not have to be carried along in order to have the information carrier I available.

Figure 1:
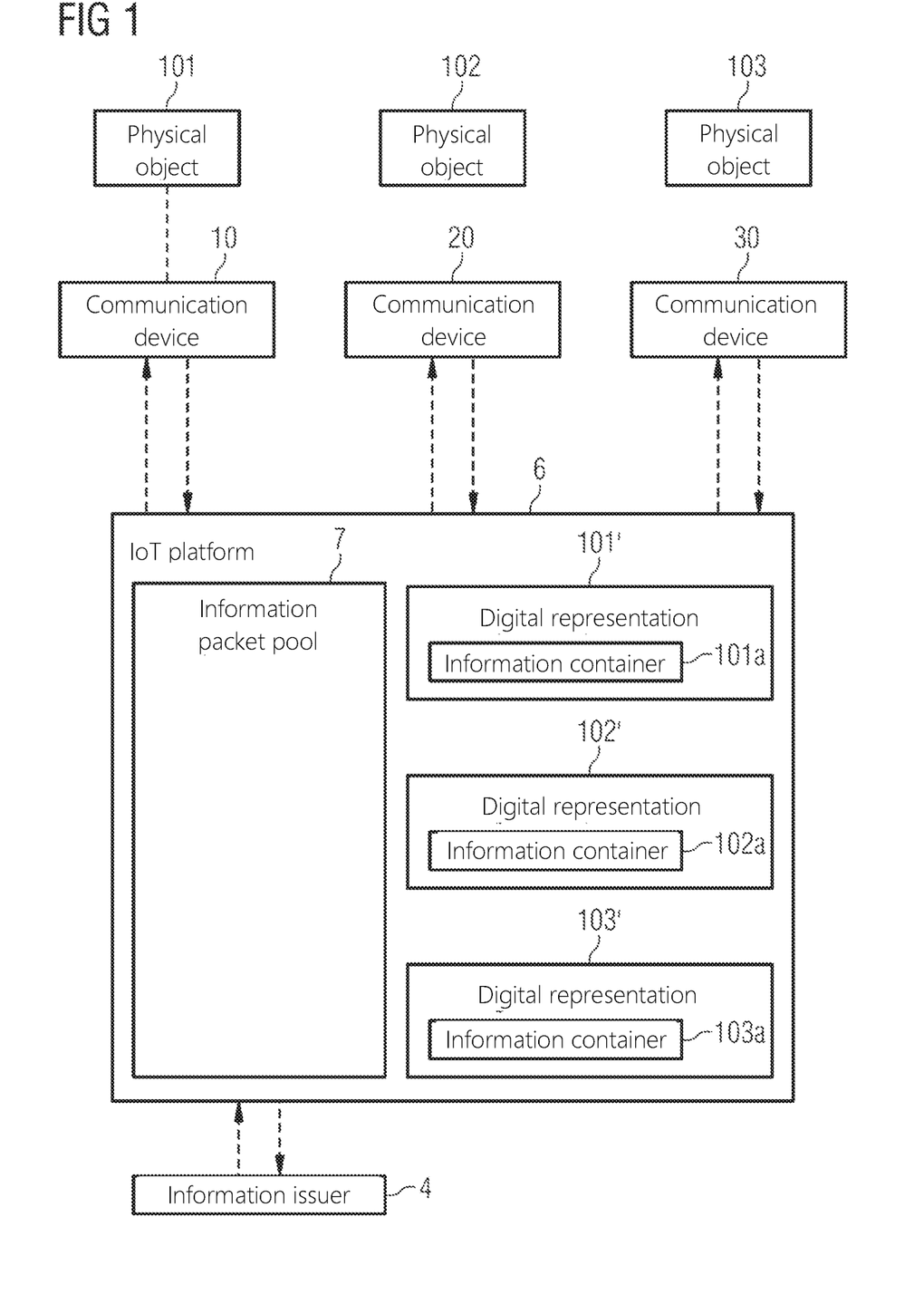
FIG. 1 shows a first schematic illustration of embodiments of the present invention.

In particular in FIG. 1 it is schematically illustrated that one of the communication devices 10, 20, 30, namely, the communication device 10, reads one of the physical objects 101, 102, 103, namely, the physical object 101, and accesses the IoT platform 6 or the digital representation 101' and the information container 101*a*. A communication channel exists between the IoT platform 6 and the communication device 10. The information container 101*a* may contain various types of information packets. In the simplest case, the information container 101*a* contains a static information packet with information about the physical object 101.

Figure 2:
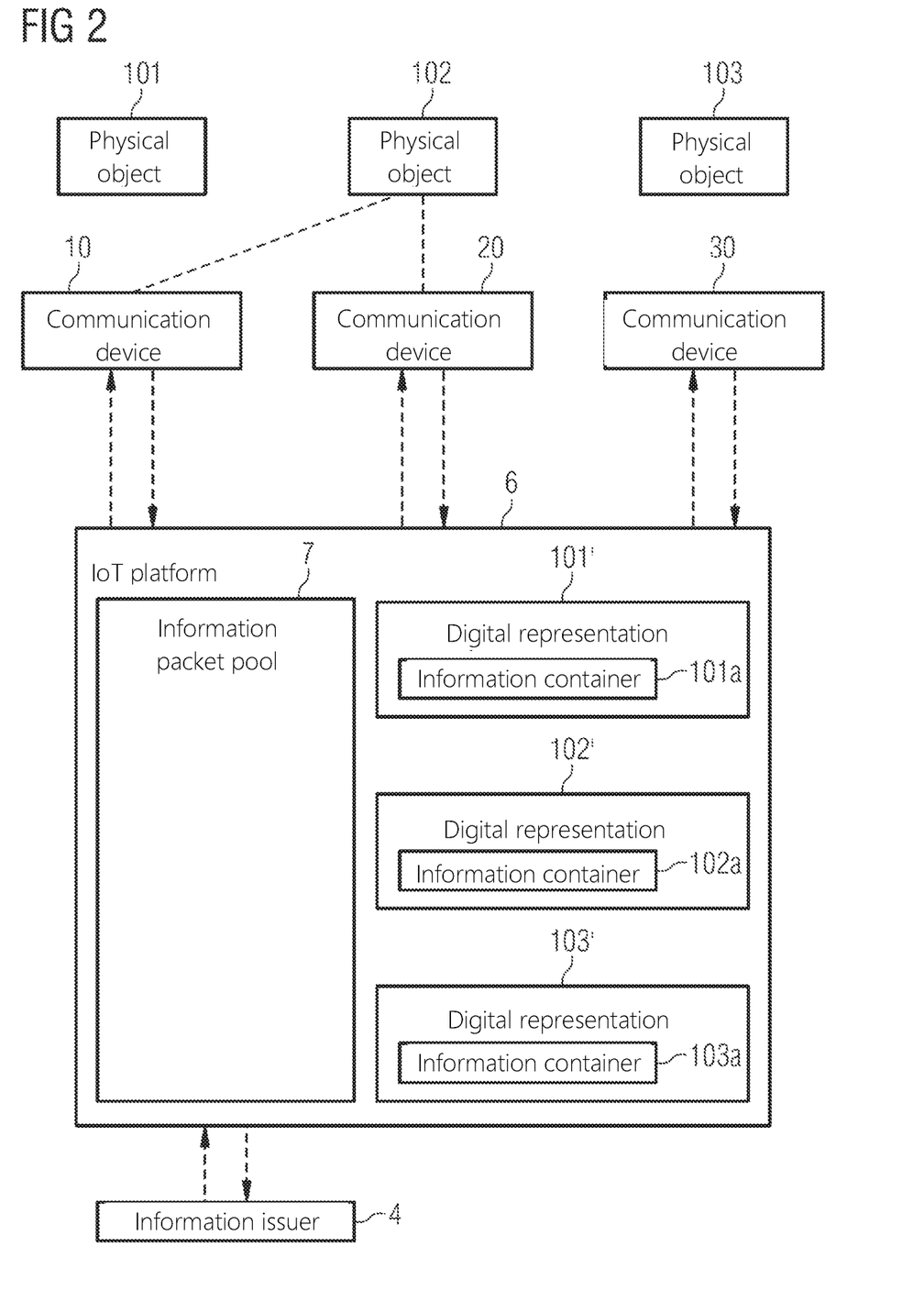
FIG. 2 shows a second schematic illustration of embodiments of the present invention.

In particular in FIG. 2, the communication device 10 and the communication device 20 read the information carrier I of the physical object 102. The communication devices 10, 20 both access the IoT platform 6 or the digital representation 102' and the information container 102a. A communication channel exists between the IoT platform 6 and the communication device 10, and a further communication channel exists between the IoT platform 6 and the communication device 20. The information container 102a may contain various types of information packets.

According to a first example, the information container 102a contains a static information packet with information about the physical object 102. The static information packet may be simultaneously accessed by the communication devices 10, 20.

According to a second example, the information container 102b contains a dynamic information packet that includes operating instructions for using the physical object 102, the operating instructions being designed as a type of "Wiki," so that various users may enter their experiences in the operating instructions. A user of the communication device 10 may thus enter his/her experiences in the dynamic information packet in the information container 102a of the digital representation 102', so that a user of the communication device 20 may retrieve, at the same time or at a later time, the entered further use information for using the physical object 102. The user of the communication device 20 may add his/her own experiences to the dynamic information packet and/or correct the entered information from the user of the communication device 10.

According to a third example, the information container 102a includes an access-sensitive information packet, and a counter increments with each access. After 100 accesses, for example, any further access is denied.

According to a fourth example, the information container 102a contains a gateway information packet, wherein a user of the communication device 10 would like to share information with a user of the communication device 20, possibly without knowing the latter's identity. For this purpose, the user of the communication device 10, using his/her communication device 10, sends information to the IoT platform 6 or to the gateway information packet in the information container 102a of the digital representation 102', while a user of the communication device 20, at the same time or at a later time, accesses the gateway information packet, and may retrieve information that is shared by the user of the communication device 10.

Figure 3:
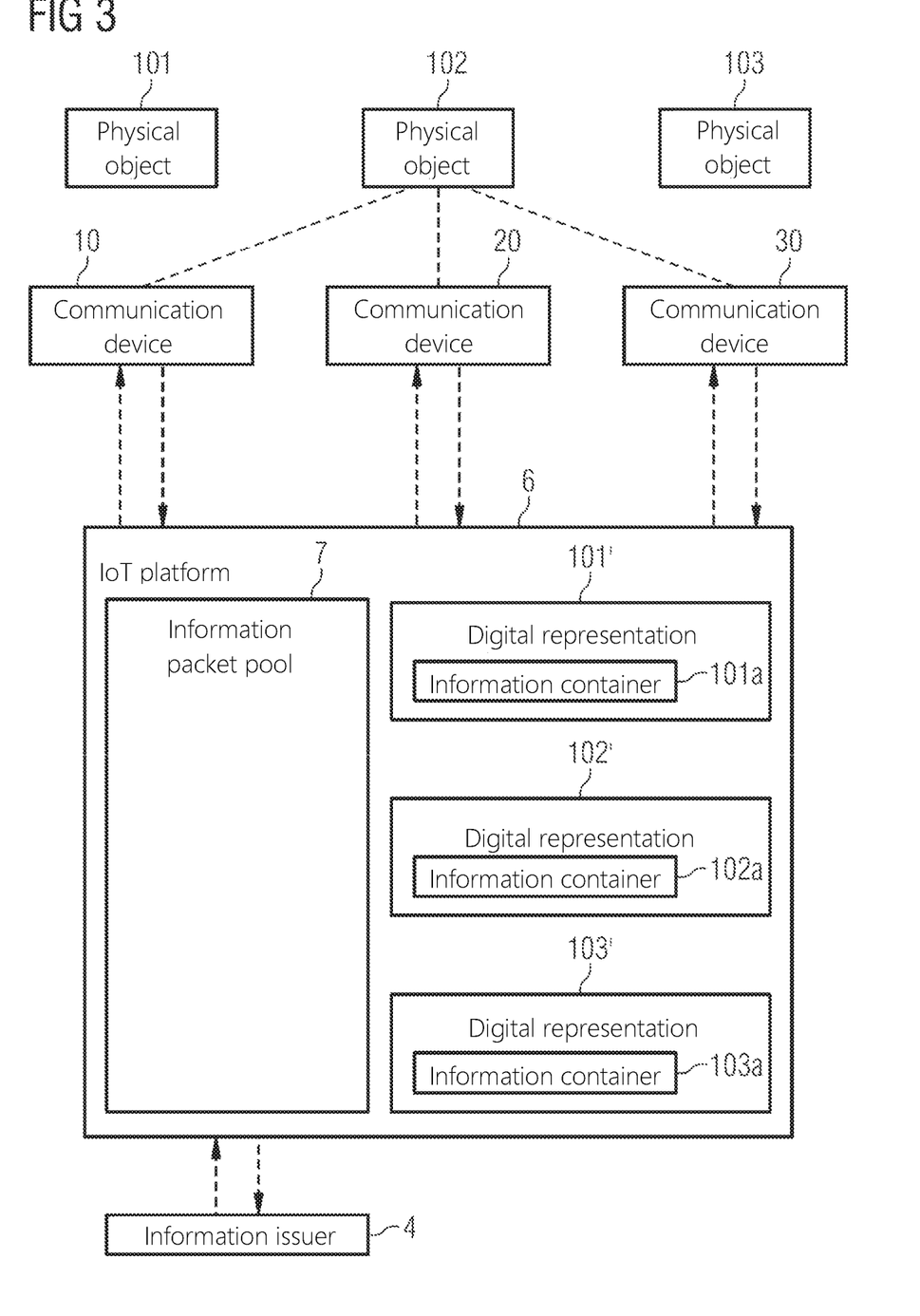
FIG. 3 shows a third schematic illustration of embodiments of the present invention.

In particular in FIG. 3, the communication device 10, the communication device 20, and the communication device 30 read the information carrier I of the physical object 102. The communication devices 10, 20, 30 access the IoT platform 6 or the digital representation 102' and the information container 102a. A communication channel exists between the IoT platform 6 and the communication device 10, between the IoT platform 6 and the communication device 20, and between the IoT platform 6 and the communication device 30. Here as well, the information container 102a may contain various types of information packets. The retrieval of information or the object-related communication takes place as described above.

Figure 4:
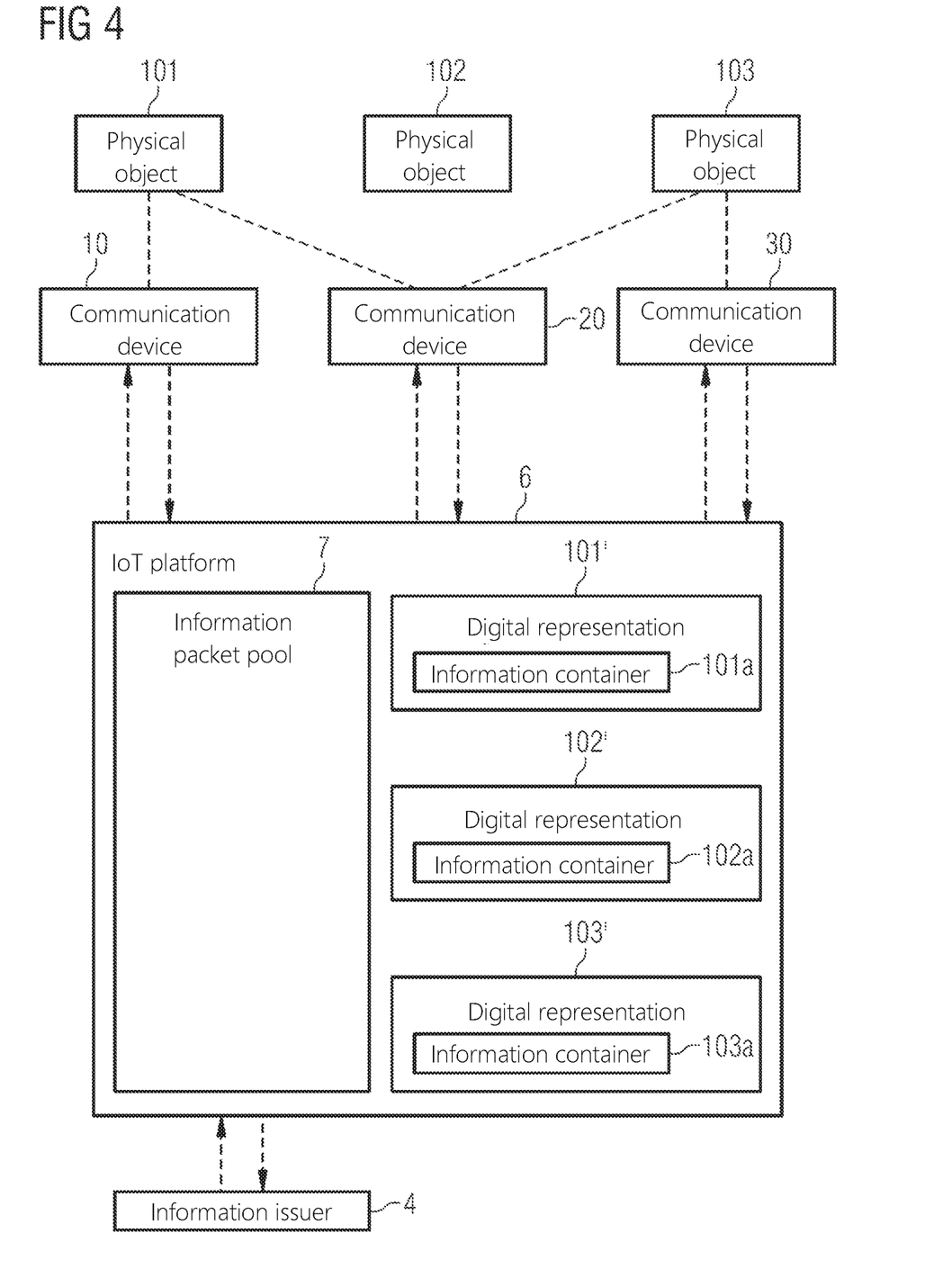
FIG. 4: shows a fourth schematic illustration of embodiments of the present invention.

In particular in FIG. 4, the communication device 10 and the communication device 20 read the information carrier I of the physical object 101, while the communication device 20 and the communication device 30 read the information carrier I of the physical object 103. The communication devices 10, 20 both access the IoT platform 6 or the digital representation 101' and the information container 101a, while the communication devices 20, 30 access both the IoT platform 6 or the digital representation 103' and the information container 103a. A communication channel exists between the IoT platform 6 and the communication device 10, a further communication channel exists between the IoT platform 6 and the communication device 20, and a further communication channel exists between the IoT platform 6 and the communication device 30. The communication device 20 simultaneously accesses the digital representations 101' and 103' via the communication channel. An information exchange or object-related communication may take place as described above.

FIG. 5 schematically illustrates a situation in which a communication device 10 designed as a mobile terminal reads in an information carrier I of a physical object 101 using a reading device 40 that is designed as a camera. The mobile terminal communicates with an IoT platform 6, concurrently or with a time delay, for example to retrieve or check any information packets that are present in the information container 101a, 102a, 103a of a digital representation 101, 102, 103 of a respective physical object 101, 102, 103. The mobile terminal may be a mobile terminal of an owner of a physical object 101, 102, 103, a mobile terminal of a visitor or user of a particular physical object 101, 102, 103, or a mobile terminal of a person who is directly or indirectly provided with the information carrier I solely for object-related communication. In particular, the identifier is detected during reading of the information carrier I.

A communication device may also be used as a carrier device: After the identifier UID has been detected, it may be virtually relayed via existing communication interfaces of the communication device that is used as a carrier device, for example via Bluetooth interfaces, Wi-Fi interfaces, NFC interfaces, or via a display device for displaying a visual data code (QR code, for example). In other words, in this configuration the communication device that is used as a carrier device may replace a physical object 101, 102, 103 so that it does not have to be carried along.

Various use scenarios of the present invention are explained below, but are not limited thereto:

A

An end user purchases a Kölsch beer glass in a local retail store. The Kölsch glass has an information carrier I that is designed as a QR code. The QR code includes an identifier UID via which the Kölsch glass or the physical object 101 is unequivocally assignable to a digital representation 101' on an IoT platform 6. The digital representation 101' of the Kölsch glass has been created beforehand, for example at the time the Kölsch glass was manufactured. An information issuer 4, for example the manufacturer of the Kölsch glass, has provided in the digital representation 101' in question in the particular information container 101a a static information packet containing information about the history of beer brewing in the city of Cologne. In addition, the information issuer 4 has provided a dynamic information packet containing an incomplete list of various types of Kölsch, with evaluation masks regarding taste and aroma being stored for each type of Kölsch. The end user who has purchased the Kölsch glass reads the information carrier I, using his/her mobile terminal, and a communication channel to the IoT platform 6 is established via the mobile data network. No data are transferred which could reveal the identity of the end user. This involves strictly object-related data, i.e., data that unequivocally identify the physical object 101, and allow an assignment to a certain associated digital representation 101'. The identifier UID on the information carrier I of the Kölsch glass is detected during the reading. A persistent identifier PID which is designed as an internet link and which in particular may include the identifier UID is subsequently created from the identifier UID.

The mobile terminal accesses the IoT platform 6 via an internet connection by calling up the internet link. The mobile terminal is thus led directly to the appropriate digital representation 101', and may access the information container 101a in order to retrieve the information packets. The end user obtains a display of the two available information packets on his/her mobile terminal, and selects the static information packet via an input on his/her mobile terminal. Information about the history of beer brewing in the city of Cologne is subsequently presented as audio, video, or in text form.

B

This involves the same configuration as in use scenario A; the end user in his/her free time likes to sample various types of Kölsch, also from smaller brewhouses that are not very well known. The end user desires to share his/her experiences and to view the experiences of other end users. For this purpose, the end user selects the dynamic information packet on his/her mobile terminal and views the list containing the various types of Kölsch. Whenever he/she tries a new type, he/she enters the information in the dynamic information packet and makes it available to other users, for example his/her friends. Conversely, he/she reads with interest the experiences that have been entered by other users. The dynamic information packet is used as a type of "Wiki."

C

This involves the same configuration as in use scenario A; an information issuer 4 has also added an access-sensitive information packet in the information container 101a of the digital representation 101'. This access-sensitive information packet counts the accesses of the digital representation that take place, and preferably counts the number of accesses specifically for each information packet that is stored in the information container 101a. Depending on the authorization, it is possible for only the information issuer 4, or any user who accesses the access-sensitive information packet using his/her communication device 10, 20, 30, to see how often the digital representation 101' and/or the individual stored information packets in the information container 101a has/have been accessed. In addition, the access-sensitive information packet may also store information concerning at what time and/or time of day accesses have taken place. Numerous conclusions may be drawn from this information, for example the level of interest in the information packets stored in the information container 101a, the time of day at which the Kölsch consumption preferably takes place, etc.

D

In this use scenario, the method according to the invention is used by an innkeeper in order to communicate with his/her customers, and conversely, to allow his/her customers to communicate with him/her. The communication takes place on an object-related basis and without exchanging information that could reveal the identity of involved persons. For this purpose, the innkeeper has a number of tables at which customers are served. In this use scenario, each table is a physical object 101, 102, 103 within the meaning of the present invention, and is provided with a respective information carrier I. There is an unequivocally assignable digital representation 101', 102', 103' on an IoT platform 6 for each table. In each case a gateway information packet and an access-sensitive information packet are stored in the respective information containers 101a, 102a, 103a of the particular digital representations 101, 102, 103. The information carrier I on the tables may have an inscription that invites the customer to scan the information carrier using a mobile terminal. By doing so, a customer may access the available information packets in the particular information container 101a, 102a, 103a. The gateway information packet may in particular be used to write a message to the innkeeper that something is not satisfactory with the meal, or that something is lacking at the table. In addition, the gateway information packet may be used to request the check or to praise the service. The innkeeper has a mobile terminal which he/she uses to communicate with the IoT platform 6 in order to access the information packets in real time. The access-sensitive information packet increments upon each access to the digital representation, and stores the time of the access. The innkeeper may use this information in particular to find out which tables are most attractive to customers. For example, the innkeeper may have round, square, and rectangular tables that are each situated at various locations on an outdoor patio. Since each table has its own digital representation 101', 102', 103' that is unequivocally assignable to the particular table, the accesses that have been recorded by the access-sensitive information packets may be readily assigned to the tables on the outdoor patio. Under the assumption that among the free tables, customers always look for the ones that appear most attractive to them, the innkeeper may derive valuable information from the number of accesses. The innkeeper is able in particular to optimize the types of tables and the arrangement of the tables on the outdoor patio order to appeal to the greatest possible number of customers.

E

This scenario is based on the configuration of use scenario D; in addition, a first static information packet and a second static information packet are stored in the information containers 101a, 102a, 103a. The menu of the inn is retrievably stored in the first static information packet. The history of the inn is retrievably stored in the second static information packet. Thus, a customer may easily retrieve the menu on his/her mobile terminal and learn more about the history of the inn while waiting for the ordered meal to be brought to the table.

F

In this use scenario, the method according to the invention is used within the scope of a geocaching game. In the German-speaking regions, geocaching is also referred to as a GPS-Schnitzeljagd [GPS scavenger hunt]. This is a type of treasure hunt which has enjoyed increasing popularity since the turn of the millennium, and which has become a recreational activity for more and more people. The hiding places or "geocaches" are made publicly available on the internet, using geographical coordinates, and may be subsequently searched for using a GPS receiver. A geocache is generally a waterproof container in which a logbook is present. The visitor may make an entry in the logbook to document his/her successful search and to notify other participants. It is important that other persons who are not taking part in the game do not find the hiding place. In addition, the participants are to remain anonymous to one another.

By use of the method according to the invention, the logbook may be replaced, communication between participants of the game may be enabled, and it may be made more difficult to find the hiding place. For this purpose, for example for a hiding place in a forest, a tree may be designated as a physical object 101 according to the invention by affixing an information carrier I, which leads to a digital representation 101', to the tree. An information carrier I may be a small QR code or a small NFC chip, so that it is more easily concealable and less noticeable than a logbook.

The information container 101a of the digital representation 101' contains an access-sensitive information packet, a dynamic information packet, and a gateway information packet. If a participant finds the hiding place, he/she uses his/her mobile terminal to read the information carrier I, and a communication channel to the IoT platform 6 is established. The participant obtains a display of the available information packets on the mobile terminal.

The access-sensitive information packet counts the number of accesses to the digital representation, and at the same time stores the time of the accesses. Thus, a game administrator of the geocaching game may track the frequenting of the hiding place, and on this basis may remove the hiding place or change the position of the hiding place if necessary, for example to make it easier to find.

Participants may enter free text or images into the dynamic information packet. The dynamic information packet replaces the logbook, and at the same time easily allows the entry of images that may be recorded using the mobile terminal. Thus, a participant who experiences bad weather, for example, may take a photo of the weather situation and add it to his/her free text as exciting additional information.

As the result of access to the gateway information packet, various participants who have found the hiding place and read in the information carrier I may communicate with one another without disclosing information that could reveal their identities. Thus, for example, a group of 30 persons who would like to take part in a geocaching game may be divided into six subgroups of five persons each by a game administrator. The persons within a subgroup may personally communicate with one another, but there may be a need to communicate with all persons in the group. Communication with all persons in the group may be easily made possible by means of the gateway information packet. Thus, a person in a first subgroup may send photos, for example, to other persons in other groups.

G

Further options, within the scope of which the present invention may advantageously be used, are briefly summarized below:

Incentives, promotional codes, or authorizations to participate, which for example allow participation in a lottery, may be stored for users in information packets that are present in information containers 101a, 102a, 103a of digital representations 101', 102', 103' of respective physical objects 101, 102, 103. A culinary establishment may, for example, allow customers to participate, via mobile terminals, in lotteries that are suitable for a current situation. A game may be stored on a beer glass bearing a label of a certain brewery, and the customer may take part in the game anonymously, for example to win a free drink.

Communication devices 10, 20, 30 may also be service devices that service the physical objects 101, 102, 103. For example, a dishwasher of an innkeeper for washing beer glasses, which may be the physical objects 101, 102, 103 within the meaning of the present invention, may be such a communication device 10, 20, 30. During each wash cycle, the dishwasher reads in the information carrier I of the beer glasses in the dishwasher and accesses the digital representations 101', 102', 103'. An access-sensitive information packet increments by one count for each information container 101a, 102a, 103a of the particular digital representations 101', 102', 103' during each wash cycle. After a predefined number of washing operations or accesses, the innkeeper receives a message that a beer glass should be replaced. Alternatively or additionally, the dishwasher may select a suitable wash cycle, as a function of information present in the particular digital representations 101', 102', 103', that takes into account, for example, a certain degree of wear of the beer glasses. The degree of wear of the beer glasses may be derived, for example, via information of an access-sensitive information packet.

In addition, via an information carrier I on a product, which is a physical object 101, 102, 103 within the meaning of the present invention, it may be verified and/or checked whether the product is an original product. Static information packets, for example, may be used for this purpose. Alternatively or additionally, warning messages, operating instructions, etc., may be stored.

In addition, certain products that are physical objects 101, 102, 103 within the meaning of the present invention may be provided with point-based bonus programs. In contrast to known bonus programs, due to the object-related communication of information the identity of the purchaser of the product may be protected, since data that could reveal the identity of persons are not necessary. Alternatively or additionally, first products may trigger price discounts upon purchase of second products when the information carriers I of the first products are read by a checkout device, which may be a communication device 10, 20, 30 within the meaning of the present invention.

LIST OF REFERENCE SYMBOLS 4 information issuer
6 IoT platform
7 information packet pool
10, 20, 30 communication device
40 reading device
101, 102, 103 physical objects
101', 102', 103' digital representations
I information carrier
UID identifier
information container 101a, 102a, 103a

The invention claimed is:

1. A method for providing object-related communication that takes place based on a physical object, the method comprising:
   creating a digital representation of a physical object, preferably on an IoT platform, the physical object including at least one information carrier,
     the information carrier including at least one identifier, the physical object being unequivocally assignable to its digital representation, based on the identifier, and
     the information carrier being readable by means of communication devices in order to at least partially access the particular digital representation, providing a configurable information container for the digital representation, it being possible for the information container to include at least one static information packet and/or at least one dynamic information packet and/or at least one access-sensitive information packet and/or a gateway information packet, each static information packet being processable solely by communication devices of information issuers, each dynamic information packet being processable by communication devices that are not solely information issuers, each access-sensitive information packet being automatically supplemented based on an access by a communication device, and the gateway information packet allowing communication between communication devices, enabling the digital representation for configuring the information container, the enabling being a mandatory prerequisite for configuring the information container of the digital representation, wherein the enabling further comprises:
a) granting permission for the configuring, preferably to certain actors, and/or
b) establishing rules for the configuring, wherein the rules may include one or more of the following rule types:
  b1) the particular information container may contain only static information packets;
  b2) the particular information container may contain only dynamic information packets;
  b3) the particular information container may contain only access-sensitive information packets;
  b4) the particular information container may contain only gateway information packets;
  b5) the particular information container must contain at least one static information packet and at least one dynamic information packet;
  b6) the particular information container must contain at least one static information packet and at least one access-sensitive information packet;
  b7) the particular information container must contain at least one static information packet and a gateway information packet;
  b8) the particular information container must contain at least one dynamic information packet and at least one access-sensitive information packet;
  b9) the particular information container must contain at least one dynamic information packet and a gateway information packet;
  b10) the particular information container must contain at least one access-sensitive information packet and a gateway information packet;
  b11) the particular information container must contain at least one static information packet and at least one dynamic information packet and at least one access-sensitive information packet:
  b12) the particular information container must contain at least one static information packet and at least one dynamic information packet and a gateway information packet;
  b13) the particular information container must contain at least one static information packet and at least one access-sensitive information packet and a gateway information packet;
  b14) the particular information container must contain at least one dynamic information packet and at least one access-sensitive information packet and a gateway information packet;
  b15) the particular information container may contain only certain information packets from an information packet pool;
  b16) there is a maximum limit for the number of information packets in the particular information container;
  b17) there is a minimum limit for the number of information packets in the particular information container:
  b18) the addition or the removal of information packets may take only within certain time periods and/or at certain times of day; and/or
  b19) the addition or the removal of information packets can take place only when a certain further condition besides the enabling of the digital representation is met.

2. The method according to claim 1, the method further comprising:
providing a communication channel between a communication device and the IoT platform when the communication device directly or indirectly reads the information carrier of the physical object, the communication device preferably having an internet connection via which it accesses the particular digital representation.

3. The method according to claim 2, wherein when the communication channel is provided, the IoT platform sends information packets via the communication channel and receives requests and/or information via the communication channel.

4. The method according to claim 2, wherein multiple communication channels for various communication devices are provided when the various communication devices directly or indirectly read the information carrier of the physical object.

5. The method according to claim 1, wherein when the information container includes a gateway information packet, the gateway information packet acts as a cache for information that is communicated from communication devices to the digital representation to allow communication between various communication devices by relaying this information to other communication devices, this preferably taking place via a combination of multiple communication channels.

6. The method according to claim 1, wherein when the information container includes at least one access-sensitive information packet, with each access by a communication device the access-sensitive information packet is supplemented with additional information about the access that takes place, the supplementation preferably including the time of the access and/or the type of communication device that has accessed the information packet.

7. The method according to claim 1, further comprising:
communicating an overview of all information packets, present in the information container, to a communication device when the communication device directly or indirectly reads the information carrier of the physical object and accesses the digital representation, the overview of the information packets preferably being displayed by a display device of the communication device, and certain information packets that are to be retrieved from the IoT platform by the communication device being selectable via an input into the communication device.

8. The method according to claim 1, the method further comprising:
configuring the information container of the digital representation, the configuring of the information container preferably being carried out by a communication device of an information issuer who preferably is neither the owner nor the issuer of the physical object, including
i) adding at least one information packet to the information container of the digital representation, and/or
ii) removing at least one information packet from the information container of the digital representation.

9. The method according to claim 1, further comprising: providing an information packet pool that includes available information packets, it being possible for information packets of the information packet poo that are newly available to be created by an information issuer, who preferably is neither the owner nor the issuer of the physical object.

10. The method according to claim 1, wherein the configuring of the information container of the digital representations takes place at least semiautomatically, in that the information packets that are available for the digital representation are preferably automatically preselected, based on a certain feature of the digital representation, via machine learning.

11. The method according to claim 1, wherein for creating the digital representation, an initially unassigned digital representation s created regardless of the existence of the physical object, it being possible to subsequently link to the physical object by means of the identifier.

12. The method according to claim 1, further comprising: issuing the physical object with the information carrier, wherein the manufacture of the physical object, the manufacture of the information carrier, and the addition of the information carrier to the physical object take place independently of one another, and are preferably carried out by at least two different actors.

13. An IoT platform comprising:
a computer program executing on the IoT platform and configured to, when executed by a computer of the IoT platform, to:
create a digital representation of a physical object the physical object including at least one information carrier,
the information carrier including at least one identifier, the physical object being unequivocally assignable to its digital representation, based on the identifier, and
the information carrier being readable by means of communication devices in order to at least partially access the particular digital representation,
provide a configurable information container for the digital representation, it being possible for the information container to include at least one static information packet and/or at least one dynamic information packet and/or at least one access-sensitive information packet and/or a gateway information packet,
each static information packet being processable solely by communication devices of information issuers,
each dynamic information packet being processable by communication devices that are not solely information issuers,
each access-sensitive information packet being automatically supplemented based on an access by a communication device, and
the gateway information packet allowing communication between communication devices,
enable the digital representation for configuring the information container, the enabling being a mandatory prerequisite for configuring the information container of the digital representation, wherein the enabling further comprises:
a) granting permission for the configuring, preferably to certain actors, and/or
b) establishing rules for the configuring, wherein the rules may include one or more of the following rule types:
b1) the particular information container may contain only static information packets;
b2) the particular information container may contain only dynamic information packets;
b3) the particular information container may contain only access-sensitive information packets;
b4) the particular information container may contain only gateway information packets:
b5) the particular information container must contain at least one static information packet and at least one dynamic information packet;
b6) the particular information container must contain at least one static information packet and at least one access-sensitive information packet;
b7) the particular information container must contain at least one static information packet and a gateway information packet;
b8) the particular information container must contain at least one dynamic information packet and at least one access-sensitive information packet;
b9) the particular information container must contain at least one dynamic information packet and a gateway information packet;
b10) the particular information container must contain at least one access-sensitive information packet and a gateway information packet;
b11) the particular information container must contain at least one static information packet and at least one dynamic information packet and at least one access-sensitive information packet;
b12) the particular information container must contain at least one static information packet and at least one dynamic information packet and a gateway information packet;
b13) the particular information container must contain at least one static information packet and at least one access-sensitive information packet and a gateway information packet;
b14) the particular information container must contain at least one dynamic information packet and at least one access-sensitive information packet and a gateway information packet;
b15) the particular information container may contain only certain information packets from an information packet pool;
b16) there is a maximum limit for the number of information packets in the particular information container:
b17) there is a minimum limit for the number of information packets in the particular information container;

b18) the addition or the removal of information packets may take only within certain time periods and/or at certain times of day; and/or
b19) the addition or the removal of information packets can take place only when a certain further condition besides the enabling of the digital representation is met.

14. A computer program that includes commands which, when the computer program is executed by a computer, prompt the computer to carry out at least:
creating a digital representation of a physical object, preferably on an IoT platform, the physical object including at least one information carrier,
the information carrier including at least one identifier, the physical object being unequivocally assignable to its digital representation, based on the identifier, and
the information carrier being readable by means of communication devices in order to at least partially access the particular digital representation,
providing a configurable information container for the digital representation, it being possible for the information container to include at least one static information packet and/or at least one dynamic information packet and/or at least one access-sensitive information packet and/or a gateway information packet,
each static information packet being processable solely by communication devices of information issuers,
each dynamic information packet being processable by communication devices that are not solely information issuers,
each access-sensitive information packet being automatically supplemented based on an access by a communication device, and
the gateway information packet allowing communication between communication devices,
enabling the digital representation for configuring the information container, the enabling being a mandatory prerequisite for configuring the information container of the digital representation, wherein the enabling further comprises:
a) granting permission for the configuring, preferably to certain actors, and/or
b) establishing rules for the configuring, wherein the rules may include one or more of the following rule types:
b1) the particular information container may contain only static information packets;
b2) the particular information container may contain only dynamic information packets;
b3) the particular information container may contain only access-sensitive information packets;
b4) the particular information container may contain only gateway information packets;
b5) the particular information container must contain at least one static information packet and at least one dynamic information packet;
b6) the particular information container must contain at least one static information packet and at least one access-sensitive information packet;
b7) the particular information container must contain at least one static information packet and a gateway information packet;
b8) the particular information container must contain at least one dynamic information packet and at least one access-sensitive information packet;
b9) the particular information container must contain at least one dynamic information packet and a gateway information packet;
b10) the particular information container must contain at least one access-sensitive information packet and a gateway information packet;
b11) the particular information container must contain at least one static information packet and at least one dynamic information packet and at least one access-sensitive information packet;
b12) the particular information container must contain at least one static information packet and at least one dynamic information packet and a gateway information packet;
b13) the particular information container must contain at least one static information packet and at least one access-sensitive information packet and a gateway information packet;
b14) the particular information container must contain at least one dynamic information packet and at least one access-sensitive information packet and a gateway information packet;
b15) the particular information container may contain only certain information packets from an information packet pool;
b16) there is a maximum limit for the number of information packets in the particular information container;
b17) there is a minimum limit for the number of information packets in the particular information container;
b18) the addition or the removal of information packets may take only within certain time periods and/or at certain times of day; and/or
b19) the addition or the removal of information packets can take place only when a certain further condition besides the enabling of the digital representation is met.

* * * * *

UNITED STATES PATENT AND TRADEMARK OFFICE
CERTIFICATE OF CORRECTION

PATENT NO. : 12,041,132 B2
APPLICATION NO. : 17/945342
DATED : July 16, 2024
INVENTOR(S) : Carsten Kehrein et al.

Page 1 of 1

It is certified that error appears in the above-identified patent and that said Letters Patent is hereby corrected as shown below:

In the Claims

Column 21, Line 57, Claim 1, "packet:" should be -- packet; --.

Column 22, Line 11, Claim 1, "container:" should be -- container; --.

Column 23, Line 8, Claim 8, "including" should be -- including: --.

Column 23, Line 16, Claim 9, "poo" should be -- pool --.

Column 23, Line 30, Claim 11, "s" should be -- is --.

Column 24, Line 24, Claim 14, "packets:" should be -- packets; --.

Column 24, Line 64, Claim 14, "container:" should be -- container; --.

Signed and Sealed this
Fourth Day of March, 2025

Coke Morgan Stewart
*Acting Director of the United States Patent and Trademark Office*